(12) United States Patent
Almutairi

(10) Patent No.: US 10,072,469 B2
(45) Date of Patent: Sep. 11, 2018

(54) SYSTEM AND METHOD FOR REMEDIATION OF OIL-CONTAMINATED SAND

(71) Applicant: Meshari Almutairi, Safat (KW)

(72) Inventor: Meshari Almutairi, Safat (KW)

(*) Notice: Subject to any disclaimer, the term of this patent is extended or adjusted under 35 U.S.C. 154(b) by 145 days.

(21) Appl. No.: 15/225,187

(22) Filed: Aug. 1, 2016

(65) Prior Publication Data

US 2017/0136504 A1    May 18, 2017

Related U.S. Application Data

(62) Division of application No. 14/945,358, filed on Nov. 18, 2015, now abandoned.

(51) Int. Cl.
| | |
|---|---|
| *E21B 21/06* | (2006.01) |
| *C02F 1/74* | (2006.01) |
| *B08B 3/08* | (2006.01) |
| *C01G 1/00* | (2006.01) |
| *C01G 1/04* | (2006.01) |
| *B09C 1/02* | (2006.01) |
| *B09C 1/06* | (2006.01) |

(Continued)

(52) U.S. Cl.
CPC .............. *E21B 21/066* (2013.01); *B08B 3/08* (2013.01); *B09C 1/02* (2013.01); *B09C 1/06* (2013.01); *B09C 1/08* (2013.01); *C02F 1/74* (2013.01); *C10G 1/002* (2013.01); *C10G 1/045* (2013.01); *C02F 1/5245* (2013.01); *C02F 2101/32* (2013.01); *C02F 2103/10* (2013.01); *C02F 2303/04* (2013.01)

(58) Field of Classification Search
None
See application file for complete search history.

(56) References Cited

U.S. PATENT DOCUMENTS 5,376,182 A * 12/1994 Everett .................... B09C 1/02
   134/1
6,082,548 A *  7/2000 Stephenson ............. B03B 5/623
   134/25.1

(Continued)

FOREIGN PATENT DOCUMENTS

JP        11-179229         7/1999
WO   WO-2005035942 A1 *  4/2005 ........... B01D 17/047

*Primary Examiner* — Eric W Golightly
*Assistant Examiner* — Arlyn I Rivera-Cordero
(74) *Attorney, Agent, or Firm* — Richard C. Litman

(57) ABSTRACT

The system and method for remediation of oil-contaminated sand provides for washing and separation of sand from oil and oil-based contamination. The system includes a feed hopper for receiving a volume of oil-contaminated sand in communication with a cleaning tank for receiving the volume of oil-contaminated sand therefrom. A mechanical stirrer mixes the volume of oil-contaminated sand with a surfactant solution in the cleaning tank. An ultrasonicator ultrasonicates the volume of oil-contaminated sand and the surfactant solution in the cleaning tank to create a mixture of washed sand and oily wastewater. A collection tank then receives the mixture. A band filter covers an open upper end of the collection tank, such that the mixture of washed sand and oily wastewater is filtered to separate out the washed sand, which may then be collected. The separated oily wastewater is then collected in the collection tank.

2 Claims, 4 Drawing Sheets

(51) Int. Cl.
   *B09C 1/08* (2006.01)
   *C02F 1/52* (2006.01)
   *C10G 1/00* (2006.01)
   *C10G 1/04* (2006.01)
   C02F 101/32 (2006.01)
   C02F 103/10 (2006.01)

(56) References Cited

U.S. PATENT DOCUMENTS

| | | |
|---|---|---|
| 2010/0185039 A1 | 7/2010 | Hoag et al. |
| 2014/0131258 A1 | 5/2014 | Piispanen |
| 2014/0137901 A1 | 5/2014 | Coates et al. |
| 2014/0151268 A1 | 6/2014 | Soane et al. |
| 2015/0014221 A1 | 1/2015 | Yoon |
| 2015/0099681 A1 | 4/2015 | Rehage |

\* cited by examiner

SYSTEM AND METHOD FOR REMEDIATION OF OIL-CONTAMINATED SAND

CROSS-REFERENCE TO RELATED APPLICATIONS

This is a division of my prior application Ser. No. 14/945,358, filed Nov. 18, 2015, now pending.

BACKGROUND OF THE INVENTION

1. Field of the Invention

The present invention relates generally to the treatment of soil, sand and the like, and particularly to a system and method for remediation of oil-contaminated sand.

2. Description of the Related Art

Oil sands (also referred to as tar sands or bituminous sands) are a type of unconventional petroleum deposit. Although it is useful to extract usable oil and other petroleum products from the oil sands, the recovered sand is also of great use. If the sand can be effectively washed or cleaned of oil, and other oil-based materials, the sand could be used for a variety of industrial applications, such as, for example, the production of asphalt concrete mixes in road bases, secondary roads, impermeable layers for landfills and containment structures, stabilizing steep embankments, enhancement of resistance to the penetration of water, chloride ions, alkali ions and the like in concrete, etc.

Although the usage of surfactants is common for the separation of the oil from the sand, the primary focus of such techniques is the remediation of oil, thus there has been little focus on further or additional processing for the sand. Thus, a system and method for remediation of oil-contaminated sand addressing the aforementioned problems is desired.

SUMMARY OF THE INVENTION

The system and method for remediation of oil-contaminated sand provides for washing and separation of sand from oil and oil-based contamination. The system for remediation of oil-contaminated sand includes a feed hopper for receiving a volume of oil-contaminated sand in communication with a cleaning tank for receiving the volume of oil-contaminated sand therefrom. The volume of oil-contaminated sand is fed to the feed hopper by a solid pump or the like. A conveyer belt preferably extends between an outlet of the feed hopper and the cleaning tank for selectively transporting the volume of oil-contaminated sand from the feed hopper to the cleaning tank.

A mechanical stirrer is provided in the cleaning tank for mixing the volume of oil-contaminated sand with a surfactant solution in the cleaning tank. An ultrasonicator in the cleaning tank ultrasonicates the volume of oil-contaminated sand and the surfactant solution in the cleaning tank to create a mixture of washed sand and oily wastewater. The cleaning tank is in communication with a collection tank for receiving the mixture. The collection tank has an open upper end and an outlet formed in a sidewall thereof. A band filter covers the open upper end of the collection tank, such that the mixture of washed sand and oily wastewater conveyed to the collection tank is filtered to separate out the washed sand, which may then be collected. The separated oily wastewater is then collected in the collection tank. A separate sand receptacle may be provided for receiving the washed sand filtered from the mixture by the band filter.

For treatment of the oily wastewater, an aeration tank is in communication with the outlet of the collection tank for receiving the oily wastewater for aeration thereof. The aeration tank not only aerates the oily wastewater but decontaminates the oily wastewater by destroying and/or immobilizing any microorganisms therein. A coagulation tank is in communication with the aeration tank for mixing the oily wastewater, following aeration thereof, with at least one coagulant for separation of the oily wastewater into treated water and an oily sludge. The treated water may then be drawn off and stored in a treated water tank. The oily sludge may be collected for disposal or recycling thereof.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
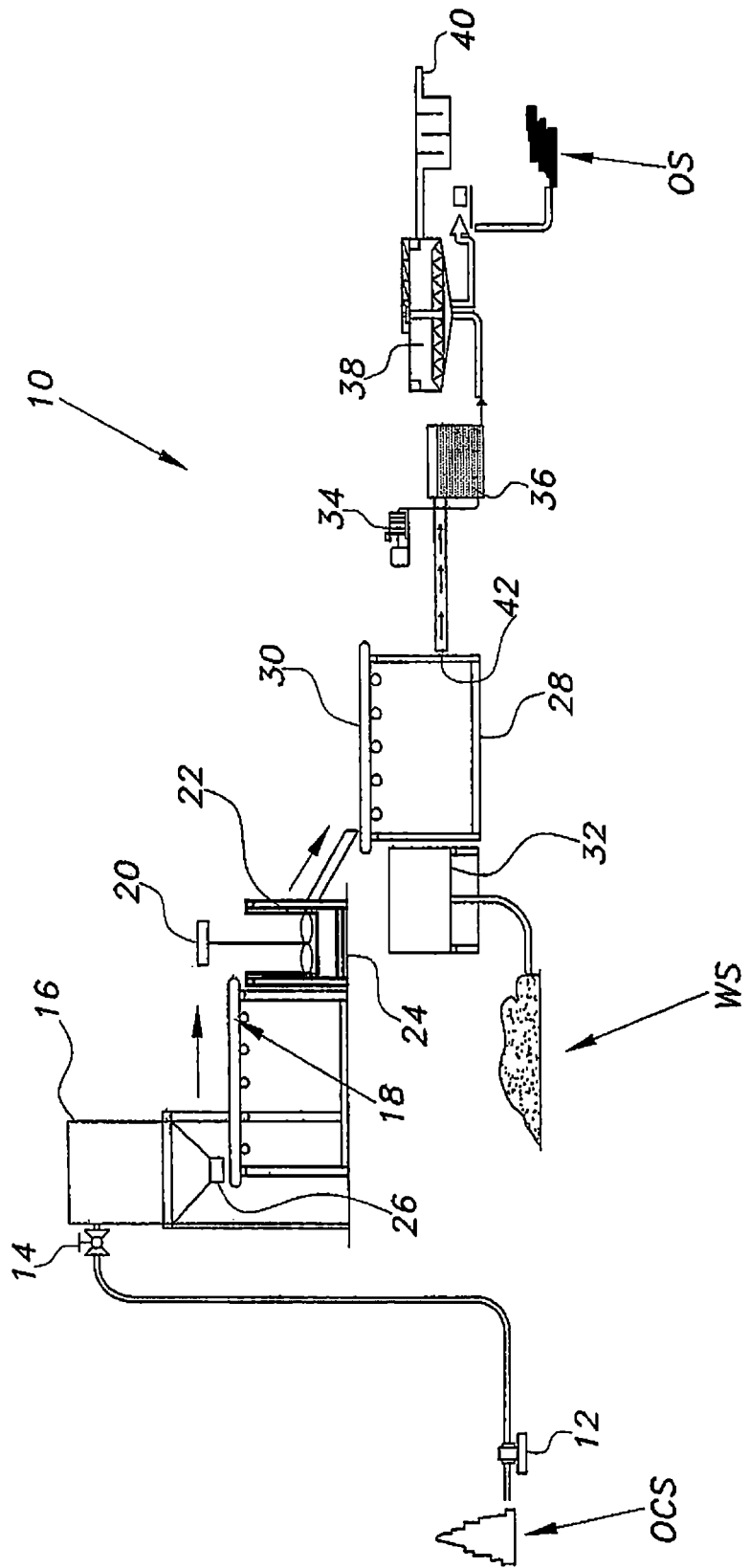
FIG. 1 diagrammatically illustrates a system for remediation of oil-contaminated sand according to the present invention.

The system and method for remediation of oil-contaminated sand (OCS) provides for washing and separation of sand from oil and oil-based contamination. As illustrated in FIG. 1, the system for remediation of oil-contaminated sand 10 includes a feed hopper 16 for receiving a volume of oil-contaminated sand. The volume of oil-contaminated sand is fed to the feed hopper 16 by a solid pump 12 or the like, and the flow into the feed hopper 16 may be selectively controlled by a valve 14. Preferably, the feed hopper 16 is provided with a filter for separating out relatively large particles (on the order of 10 mm in diameter or greater), such as coarse aggregate, metal pieces, etc.

The feed hopper 16 is in communication with a cleaning tank 24 for receiving the volume of oil-contaminated sand. The oil-contaminated sand may be selectively transferred to the cleaning tank 24 by any suitable method, such as, for example, a conveyer belt 18 extending between an outlet 26 of the feed hopper 16 and the cleaning tank 24. A mechanical stirrer 20 or the like is provided for mixing the volume of oil-contaminated sand with a surfactant solution in the cleaning tank 24. The soil solution ratio can be about 1:2 (mass/volume). Preferably, the surfactant solution is an environmentally-friendly surfactant, such as saponin. About 0.25 wt % surfactant can be present for each batch wash. After or during the mixing by the mechanical stirrer 20, an ultrasonicator 22 ultrasonicates the volume of oil-contaminated sand and the surfactant solution in the cleaning tank 24 to create a mixture of washed sand and oily wastewater. Preferably, the washing of the sand, including both mixing and sonication, occurs at a temperature of approximately 60° C. For an aqueous saponin solution, the concentration of saponin in water can be approximately 0.25 wt %, with an oil-contaminated sand to surfactant solution ratio of approximately 1:2 (mass/volume). Mixing preferably takes place at an agitation speed of approximately 1,000 rpm, with an overall washing time of approximately 2 hours. It should be understood that any suitable type of sonicator may be used. Ultrasonication preferably takes place at a frequency of approximately 45 kHz.

It should be understood that cleaning tank 24 is shown in FIG. 1 for illustrative purposes only and may have any desired configuration. For example, cleaning tank 24 may have a cubical outer housing 50 cm long on each side, with a cylindrical chamber being formed therein for mixing and ultrasonication. It should be understood that cleaning tank 24 may be formed from any suitable material which will not degrade under the cleaning process, such as stainless steel or the like. Using the exemplary dimensions given above, an interior working/cleaning volume of the cleaning tank 24 would be approximately 41 cm×41 cm×36 cm, and the cylindrical chamber received therein would have approximately 24 conventional ultrasonic transducers evenly mounted in an array thereon for performing ultrasonication. Preferably, for such an exemplary system, the 24 ultrasonic transducers, each operating at approximately 45 kHz, would have an overall power output of 2,400 W.

It should be further understood that cleaning tank 24 may include any desired additional cleaning components, such as, for example, an under liquid jetting system. Such conventional under liquid jetting systems typically include a high capacity flow pump which re-circulates the cleaning solution from the main cleaning bath via an in-line strainer with a pair of stainless steel sparger pipes for increased flow agitation. Further, as noted above, the cleaning process preferably occurs at approximately 60° C. It should be understood that the internal temperature of cleaning tank 24 may be maintained and controlled by any suitable type of heating system, such as, for example, a 2 kW stainless steel immersion heater mounted near the base of cleaning tank 24. Preferably, such a heater is mounted in an offset position so as to not impede the overall height of the system. Separate heating control may include full power initial heat up, idle control, low level cut out, over temperature cut out and temperature control. It should be understood that any suitable type of mixer or stirrer may be used, e.g., a mechanical stirrer 20. For example, a 1,000 rpm motor may be attached to the lid of cleaning tank 24, with a removable paddle being fixed thereto.

The cleaning tank 24 is in communication with a collection tank 28 for receiving the mixture. The collection tank 28 has an open upper end and an outlet 42 formed in a sidewall thereof. A band filter 30 or the like covers the open upper end of the collection tank 28, such that the mixture of washed sand and oily wastewater conveyed to the collection tank 28 is filtered to separate out the washed sand WS, which may then be collected. The band filter 30 preferably has a filter size on the order of 0.04 mm for separating out the washed sand WS from the oily wastewater. The separated oily wastewater is collected in the collection tank 28. A separate sand receptacle 32 may be provided for receiving the washed sand WS filtered from the mixture by the band filter 30. The washed sand WS should have an oil residue volume of less than 1% and, thus, may be collected and shipped for the desired purposes thereof. The washed sand WS can be used, for example, for the production of asphalt concrete mixes in road bases, secondary roads, impermeable layers for landfills and containment structures, stabilizing steep embankments, enhancement of resistance to the penetration of water, chloride ions, alkali ions and the like in concrete, etc.

For treatment of the oily wastewater, an aeration tank 36 is in communication with the outlet 42 of the collection tank 28 for receiving the oily wastewater for aeration thereof. The aeration tank 36 aerates the oily wastewater. For an exemplary aeration tank 36 having a volume of 1,200 L, approximately 1,000 L of the oily wastewater would be received therein. In addition to the oily wastewater, an additional volume of prime settled sludge (PSS), obtained from a wastewater treatment plant or the like, may also be added (on the order of 100 L in this example). During the aeration process, air is continuously supplied into the aeration reactors by a compressor 34 for a period of approximately 24 hours, providing aeration, acclimatization and immobilization for any microorganisms. The aeration is preferably controlled to a rate of approximately 5.5 m/s to avoid creation of froth, thus preventing wastewater from bubbling out of the aeration tank 36. As discussed in detail below, sodium chloride (NaCl) can also be added at this stage.

A coagulation tank 38 is in communication with the aeration tank 36 for mixing the oily wastewater, following aeration thereof, with at least one coagulant for separation of the oily wastewater into treated water and an oily sludge. It should be understood that any suitable coagulant may be used. For example, approximately 1.5 kg of aluminum in approximately 10.0 L of distilled water may be used as the coagulant. With this particular coagulant, the mixture of coagulant with aerated, oily wastewater preferably has a coagulant concentration of approximately 5 wt %. Mixing of the coagulant and the aerated, oily wastewater in the coagulation tank 38 preferably occurs with an agitation speed of approximately 50 rpm for a period of approximately 45 minutes to ensure that the wastewater and coagulant are well mixed. The mixing speed may then be gradually reduced to 0 rpm, followed by an overnight settling period. The treated water may then be drawn off and stored in a treated water tank 40. The oily sludge OS may be collected for disposal or recycling thereof.

Figure 2:
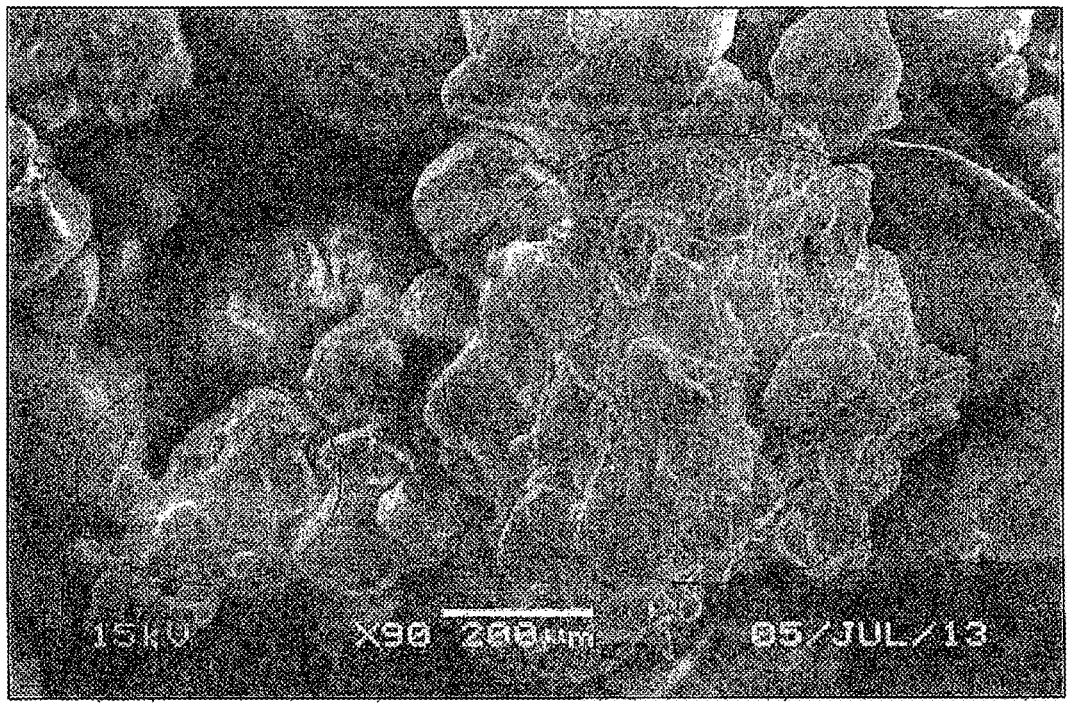
FIG. 2 is a scanning electron microscope (SEM) micrograph (at 90× magnification) showing surfaces of oil-contaminated sand prior to treatment with the system and method for remediation of oil-contaminated sand according to the present invention.
Figure 3A:
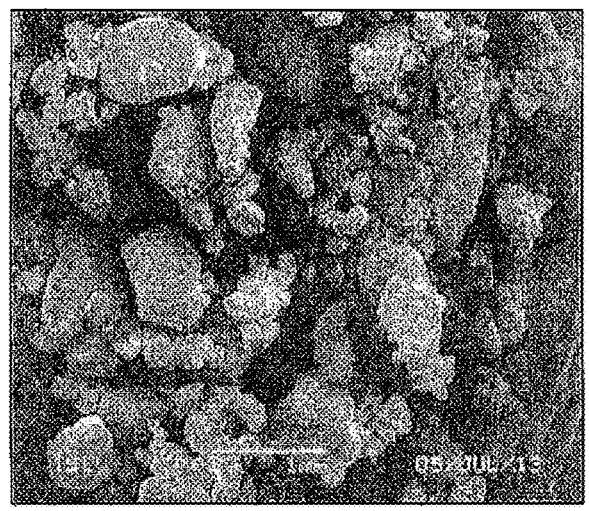
FIG. 3A is a scanning electron microscope (SEM) micrograph (at 25× magnification) showing surfaces of oil-contaminated sand prior to treatment with the system and method for remediation of oil-contaminated sand according to the present invention.
Figure 3B:
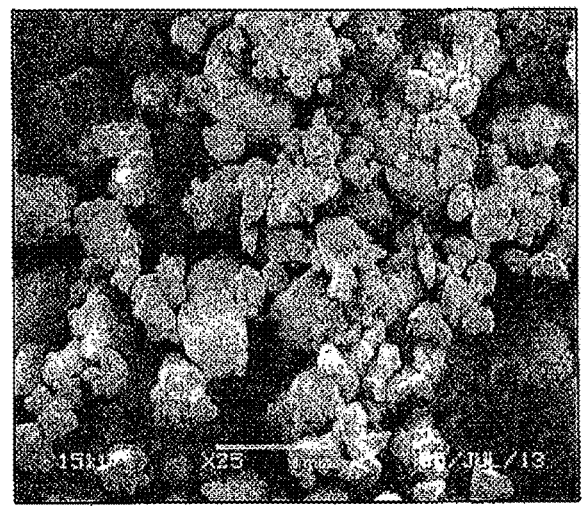
FIG. 3B is a scanning electron microscope (SEM) micrograph (at 25× magnification) showing surfaces of oil-contaminated sand following a step of mixing thereof with a surfactant solution.
Figure 3C:
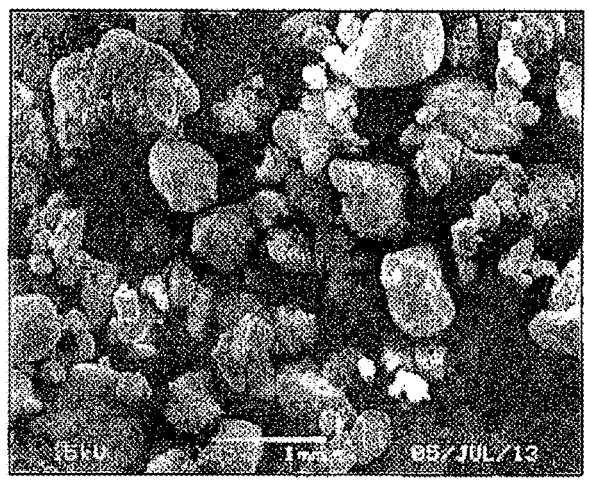
FIG. 3C is a scanning electron microscope (SEM) micrograph (at 25× magnification) showing surfaces of oil-contaminated sand following a step of ultrasonication thereof.
Figure 3D:
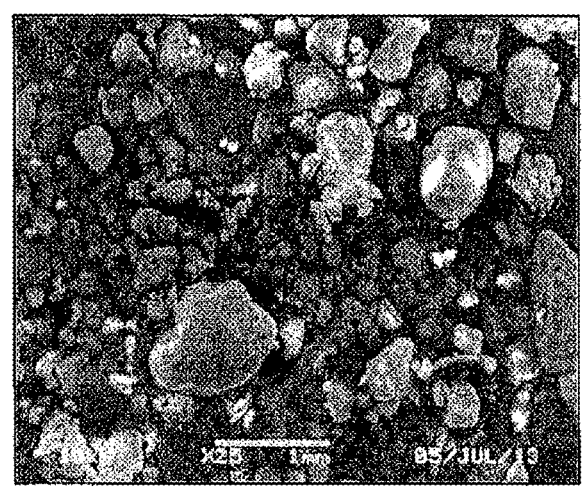
FIG. 3D is a scanning electron microscope (SEM) micrograph (at 25× magnification) showing surfaces of oil-contaminated sand following both mixing thereof with a surfactant solution and ultrasonication thereof, according to the present method for remediation of oil-contaminated sand.

FIGS. 2 and 3A are each scanning electron microscope (SEM) micrographs showing surfaces of oil-contaminated sand prior to treatment thereof. FIG. 3B is an SEM micrograph showing the surfaces of the oil-contaminated sand following mixing thereof with the surfactant solution alone. FIG. 3C is an SEM micrograph showing the surfaces of the oil-contaminated sand following ultrasonication alone. FIG. 3D is an SEM micrograph showing the surfaces of the oil-contaminated sand following both mixing thereof with the surfactant solution and ultrasonication, as in the present method. As shown, each method, taken alone (as in FIGS. 3B and 3C) results in relatively insignificant particle breakup and removal of oil, whereas the combination of both methods (as in FIG. 3D) results in noticeable particle breakup and removal of of oil residue.

The results show that the mechanical stirring enhances the ultrasonication effectiveness to the sand particles by agitating the sand matrix and aiding the dispersion of oil and sand. This improves contaminant desorption from the particle surface and effectively enhances the ultrasonic removal efficiency by generating internal air bubbles that can reach the surface of the sand. This leads to a high frequency of ultrasonic sound (on the order of 45 kHz), which produces cavitation by alternating high and low pressure waves. These bubbles grow in a low pressure phase from micro-bubbles until they are formed and compressed at a high pressure phase. The bubbles then collapse to split the oil from the fine particles with contaminants from larger parent constituents. As such, homogenization occurs by breakup of agglomerates of oil residue from the sand. Further, it can be seen that there is damage to the surface of the sand particles, which is caused by sonophysical effects. This may improve the effectiveness of contaminant removal from the sand and, moreover, the cavitation may be used to maintain the water temperature during the process by releasing large quantities of energy.

It is well known that varying ionic strength is able to affect the efficiency of the coagulation process and then flocs weight. Saponins are categorized as non-ionic biosurfactants, but contain acidic and ionizable groups of glucuronic acid as part of its head group (i.e., the hydrophilic fraction). Further, some charged species would exist in saponin solutions due to the ionic strength of artificial seawater. Thus, the ionic strength of the saponin solution may have an effect on the destabilization of colloidal particles during the coagulation/flocculation process. Specifically, sodium chloride (NaCl) aids in double layer compression. The ions with an opposite charge appear to play a significant role in improving the flocculation process by bridging the particles and allowing the flocs to be formed. The applicability of the secondary treatment (i.e., the aeration) may be able to destabilize colloidal particles by breaking down the long chain of complex organic compounds in the oil emulsion, and convert this into small molecules by increasing the surface area colloid concentration.

As a result, the contact of any microorganisms with the oily wastewater is improved and the solubility of the oil is enhanced, allowing the saponin to be available for biodegradation. In experiments, the solution of saponin in artificial seawater was aerated for 24 hours, and the average values of chemical oxygen demand (COD) were found to be reduced by about 70%. This suggests that the reduction in the COD of the oily wastewater may be due to the biodegradation of the saponin, allowing the stability of the oil emulsion to be broken down and released easily. This may be due to the double layer compression and sweep flocculation. With the increase in sodium ion concentration in the solution, the double layer becomes thinner and aids in getting same-charge particles nearer. As such, the floc formation becomes quicker and better, thus improving the settleability of the colloid matter, which causes a quick decrease in turbidity.

The two methods by which a high coagulant dosage can improve the rate of coagulation are (a) increasing metal hydroxide precipitate concentration and, thus, the rate of aggregation, and (b) enmeshing particulates to enlarge the size of aggregates using sweep-floc coagulation. In experiments with the present method, it was found that adding a high dosage of coagulant precipitated a heavy, sticky and high quantity of flocs, with an accelerated settling time. The settling time for colloidal particles by adapting the oily wastewater sample under aeration for 5 days required 15 minutes, while a sample without aeration required 24 hours to settle down. This scenario suggests that the sweep-floc coagulation (whereby the colloidal particles are removed from the suspension) occurs via enmeshment into the aluminum hydroxide $Al(OH)_3$ precipitate. This process resulted in the creation of a suspension with smaller size and high quantity of flocs. Thus, the method eliminates higher quantities of organic particles in view of the increased surface area offered for adsorption. By contrast, low doses of coagulant boosts larger and fewer quantity flocs due to the faster rate of growth compared to the rate of nucleation. This causes a reduced surface area for the adsorption of organic compounds.

The experiments suggested that the destabilization improvement of the colloidal particles occurred due to the linkage of inter-particle interactions. This effect results in the generation of a large amount of precipitation which permits the colloidal particles to be enmeshed while settling.

It is to be understood that the present invention is not limited to the embodiments described above, but encompasses any and all embodiments within the scope of the following claims.

I claim:
1. A method for remediation of oil-contaminated sand, comprising the steps of:
   providing a feed hopper for receiving a volume of oil-contaminated sand;
   providing a solid pump for feeding the volume of oil-contaminated sand directly into the feed hopper;
   providing a cleaning tank in communication with the feed hopper for receiving the volume of oil-contaminated sand from the feed hopper, the cleaning tank defining a vertically oriented tank having a bottom wall and an interior wall defining an internal chamber, wherein the cleaning tank receives the volume of oil-contaminated sand;
   mechanically mixing the volume of oil-contaminated sand with a surfactant solution in the cleaning tank, wherein the surfactant solution is an aqueous saponin solution and the mixing is at speed of 1,000 rpm over a two hour period at a temperature of approximately 60° C.;
   mounting a plurality of ultrasonic transducers in the cleaning tank for ultrasonicating the volume of oil-contaminated sand and the surfactant solution in the cleaning tank to create a mixture of washed sand and oily wastewater, wherein the plurality of ultrasonic transducers are distributed about the interior chamber of the cleaning tank;
   ultrasonicating the volume of oil-contaminated sand and the surfactant solution to create a mixture of washed sand and oily wastewater, wherein the ultrasonication is done at a frequency of 45 kHz, further wherein the steps of mixing the volume of oil-contaminated sand with the surfactant solution and ultrasonicating the volume of oil-contaminated sand and the surfactant solution are performed at the same time;
   filtering the mixture of washed sand and oily wastewater to separate the washed sand from the mixture;
   collecting the oily wastewater;
   aerating the oily wastewater with a continuous supply of air for a period of 24 hours at a rate of 5.5 meters/second thereby avoiding creation of froth; and mixing the oily wastewater with at least one coagulant for separation of the oily wastewater into treated water and an oily sludge, wherein the mixing is at speed of 50 rpm over a 45 minute period.

2. The method for remediation of oil-contaminated sand as recited in claim 1, wherein a ratio of the oil-contaminated sand to surfactant solution is 1:2 (mass/volume).

* * * * *